(12) United States Patent  (10) Patent No.: US 8,390,893 B2
Lieberman  (45) Date of Patent: Mar. 5, 2013

(54) ENCODING AND SCREENING ELECTRONIC INTEGRAL IMAGES IN PRINTING SYSTEMS

(75) Inventor: David Lieberman, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 329 days.

(21) Appl. No.: 12/953,893

(22) Filed: Nov. 24, 2010

(65) Prior Publication Data

US 2012/0127534 A1    May 24, 2012

(51) Int. Cl.
*H04N 1/405* (2006.01)
*G06K 9/40* (2006.01)
*G06K 9/36* (2006.01)
(52) U.S. Cl. .................... 358/3.06; 382/284; 382/274
(58) Field of Classification Search .................. 358/3.06; 382/284, 274
See application file for complete search history.

(56) References Cited

U.S. PATENT DOCUMENTS

2009/0021791 A1    1/2009   Ebner et al.

OTHER PUBLICATIONS

Okoshi et al., Three Dimensional Imaging Techniques, 1976, Chapter 5.2, Principle of Projection-Type Three-Dimensional Displays, pp. 126-129.

*Primary Examiner* — Charlotte M Baker
(74) *Attorney, Agent, or Firm* — Pillsbury Winthrop Shaw Pittman, LLP

(57) ABSTRACT

A method for encoding and screening electronic integral images in a printing system includes receiving an electronic integral image having a plurality of sub-images comprised of image data, wherein at least one sub-image is spaced apart from another sub-image by a background area; adding temporary image data to at least a portion of the background area image data based on image data of one or more surrounding sub-images so as to reduce the spatial variance across at least a portion of the electronic integral image and to make it more compatible to data compression without significant signal or data loss; and subsequently removing the temporary image data added to the electronic integral image so as to reconstruct an accurate representation of the electronic integral image. A system for encoding and screening electronic integral images is also disclosed.

24 Claims, 6 Drawing Sheets

ENCODING AND SCREENING ELECTRONIC INTEGRAL IMAGES IN PRINTING SYSTEMS

FIELD

This application generally relates to digital image processing, and in particular, encoding and screening electronic integral images in printing systems.

BACKGROUND

Many ink-jet printers, film recorders, and lithographic marking systems are amenable to produce integral images.

FIG. 1 shows an exemplary integral image 100 composed of a number of distinct sub-images which have been rendered upon an integral image substrate. See, e.g., Takanori Okoshi, "Three-Dimensional Imaging Techniques," pg. 128, Academic Press, 1976, herein incorporated by reference. The integral image 100 may be formed of a "fly-eye" lens sheet 110 having a plurality of lens 115 placed over a sheet 120 having the sub-images. Each sub-image may have its own lens 115 for viewing.

Depending on the viewing angle, the observer may see a different sampling of sub-images of the sheet 110 appearing from different optical focusing positions. The resulting effects may include, for instance, lenticular imaging capabilities, such as image motion, zoom/magnification, flip, and three-dimensional (3-D) effects. As a result, position-dependent changes in appearance may occur along one or more directions of motion, and hologram capability can be supported.

FIG. 2 shows a magnified portion 220 of another exemplary integral image 200 having a number of small sub-images 212. The magnified portion 220 more clearly shows the small sub-images 212 arranged in a "checkerboard" pattern. In this arrangement, each sub-image 212 is surrounded with four (white) background image areas 214. These blank areas 214 are immediately above, below, left and right of each sub-image 212.

The white background areas 214 facilitate optical isolation of the sub-images 212. This may allow a lens to resolve each sub-image 212. In this example, each sub-image 210 may itself be a 600×600 dot-per-inch (dpi) pixel.

A problem, though, with electronic integral images is that they are not readily compressible by typical electronic data compression schemes. This is because many production printing systems employ lossy block-based compressions schemes that prohibit the accurate transmission of integral images into the print engine. Block-based compression schemes may include, for example, variations of the immensely popular JPEG (Joint Photographic Experts Group) compression standard: ISO/IEC Joint Technical Committee 1, Subcommittee 29, Working Group 1 (ISO/IEC JTC 1/SC 29/WG 1)—entitled *Coding of still pictures*." These compression techniques, however, will discard (or severely reduce) high-frequency spatial frequency information. For instance, for the integral image 200 shown in FIG. 2, compression processing will be concentrated into the checkerboard pattern, which is a pattern exhibiting uncommonly high frequency content. These high frequencies are assigned the fewest bits, and suffer the highest compression related loss.

Thus, integral images are uniquely disadvantaged by typical production system image paths, where severe signal losses may occur.

SUMMARY

According to one embodiment of this disclosure, a method for encoding and screening electronic integral images comprises: receiving an electronic integral image having a plurality of sub-images comprised of image data, wherein at least one sub-image is spaced apart from another sub-image by a background area; adding temporary image data to at least a portion of the background area image data based on image data of one or more surrounding sub-images so as to reduce the spatial variance across at least a portion of the electronic integral image and to make it more compatible to data compression without significant signal or data loss; and subsequently removing the temporary image data added to the electronic integral image so as to reconstruct an accurate representation of the electronic integral image.

According to another embodiment of this disclosure, a system for encoding and screening electronic integral images in a printing system comprises: an encoder processor configured to: (i) receive an electronic integral image having a plurality of sub-images comprised of image data, wherein at least one sub-image is spaced apart from another sub-image by a background area; and (ii) add temporary image data to at least a portion of the background area image data based on image data of one or more surrounding sub-images so as to reduce the spatial variance across at least a portion of the electronic integral image and to make it more compatible to data compression without significant signal or data loss; and a halftoner configured to remove the temporary image data added to the electronic integral image.

Other features of one or more embodiments of this disclosure will seem apparent from the following detailed description, and accompanying drawings, and the appended claims.

BRIEF DESCRIPTION OF THE DRAWINGS

Embodiments of the present disclosure will now be disclosed, by way of example only, with reference to the accompanying schematic drawings in which corresponding reference symbols indicate corresponding parts, in which.

DETAILED DESCRIPTION

Methods and systems to enable encoding and screening electronic integral images are described. The electronic integral images may be stored, in a memory, transmitted via a network, and/or rendered by a printing system.

As used herein, an "integral image" is an image which is comprised of a plurality of distinct sub-images. The sub-images are each composed of image data separated by background area image data. Each sub-image is itself composed of one or more pixels forming a distinct image (from the integral image). The background image data may be comprised of "white" or blank pixels having no tone. These background pixels may facilitate physical separation of the sub-images and/or proper spacing and optical isolation with lens element (if desired).

Figure 1:
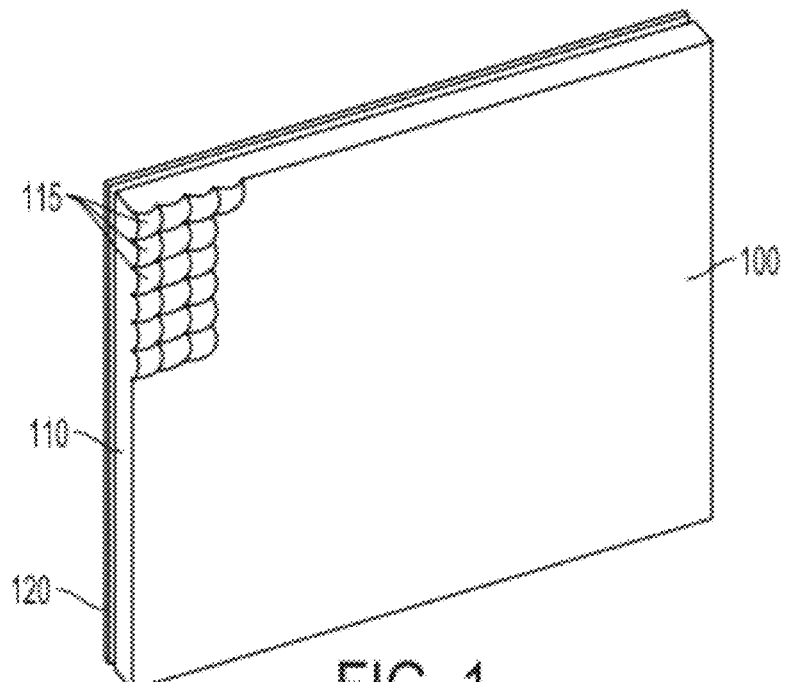
FIG. 1 shows an exemplary integral image composed of a number of distinct sub-images which have been are rendered upon integral image substrate.

Sub-images may have different sizes and/or resolutions. In one implementation, the sub-images may be viewed by an observer, for instance, through an array of spherical convex lenses, with one lens provided for each sub-image, similar as shown in FIG. 1. Of course, the sub-images may in some instances be viewed by the "naked eye" or with the aid of another type of lens or optical device.

A different type of image which uses a series of lenses is a lenticular image, which includes a plurality of interlaced images that may be viewed through the use of a series of minute extruded lenses called lenticules. Individual images may be viewed in succession when the lenticular image is viewed about one axis of rotation. Conversely, the integral image may be rotated about more axes to enable an observer to view different images.

Additionally, as used herein, an "electronic integral image" includes machine- or computer-readable data for electronically reproducing an integral image. In some instances, the electronic integral image may be an electronic document. As used herein, "electronic document" means any electronic media content that is intended to be used in an electronic form or printed output. Exemplary electronic documents may include various digital image, text, and mixed content files, such as PDF, TXT, DOC, TIFF, BMP, GIF, JPEG, and other common page description language (PDL) file and document formats, such as Adobe® Postscript®. Pixels in the electronic document may be formatted as Red-Green-Blue (RGB), cyan-magenta-yellow-black (CMYK), a device-independent color space (e.g., CIE-LAB, YCrCb, XYZ, etc.), or other pixel data formats. Conversions from one color space to another may also be possible, for instance, as known in the art.

And, as used herein, "integral imaging" is a process in which an integral image may be viewed by an observer. This may include placing an integral image behind a tessellated series of lens elements. For instance, a plurality of sub-images placed behind an array of lenses so that viewing from different angles reveals different images.

Components of the image path of a printing system that have been determined to interfere with integral image processing, may include, for instance: 1) image compression schemes which can severely degrade stressfully input image data; and 2) halftone screening that is based on a smooth input image assumption. These components, among others, can lead to a failure to properly render integral images.

Figure 3:
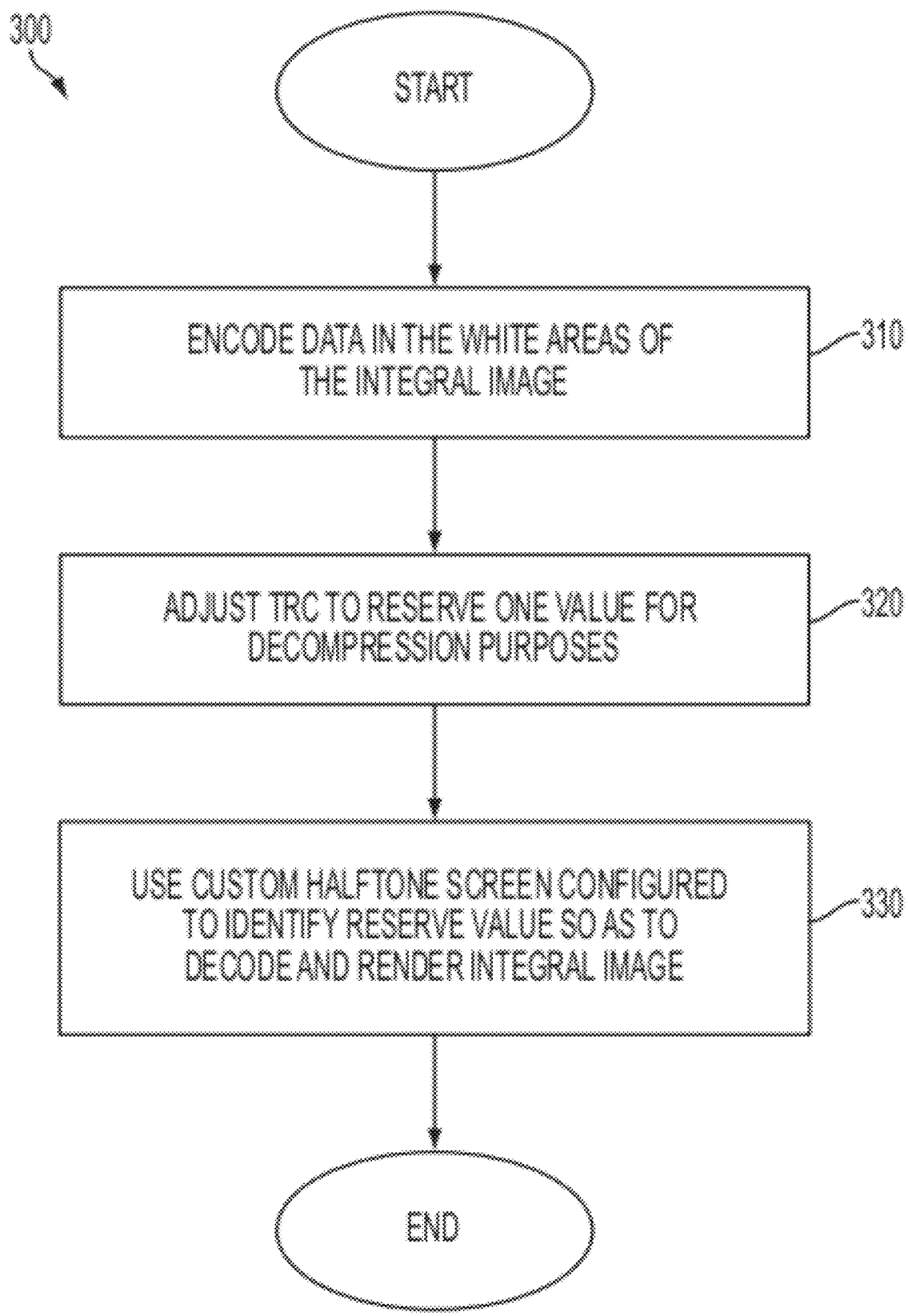
FIG. 3 shows a method for encoding and screening integral images in a printing system in accordance with an embodiment.
Figure 7:
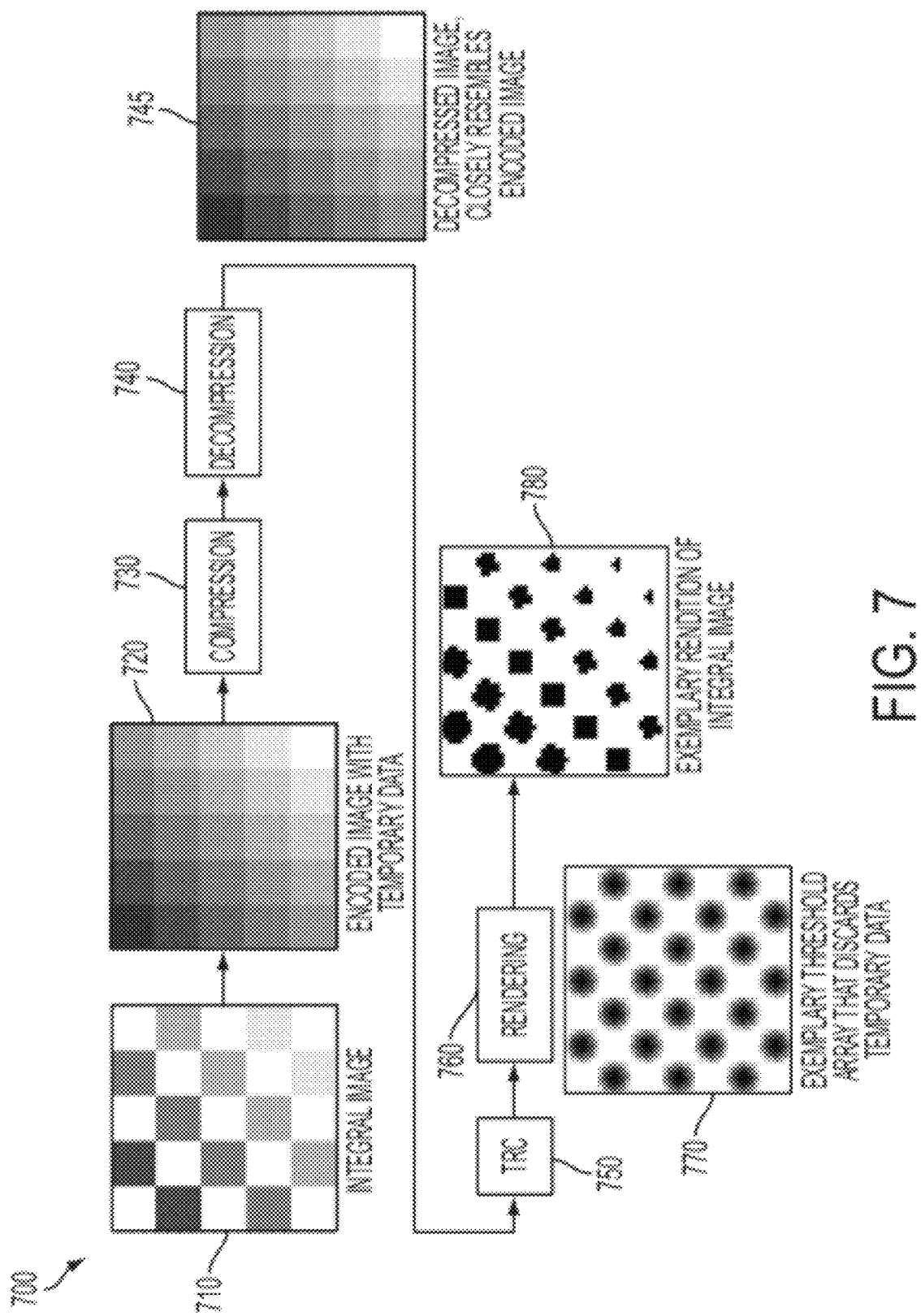
FIG. 7 shows another method for encoding and screening integral images in a printing system in accordance with an embodiment.

Thus, according to one aspect of this disclosure, a methodology for encoding and screening electronic integral images is provided. FIGS. 3 and 7, discussed below, show embodiments of the encoding and screening methodology. For instance, three (or more) steps may be used to encode, decode, and halftone integral images in the image path of a printing system. The first step may include an encoding step which adds temporary image data to portions of the electronic integral image so as to reduce the spatial frequency of the electronic integral image. This step produces a smoother input image which significantly reduces the severity of compression related signal loss due to the use of a lossy compression technology. The second step may adjust the tone range of the printing system so as to reserve a predetermined value to facilitate the decoding of the encoded integral image by discarding the temporary image data that was previously added to the electronic integral image. And, the third step may include a halftoning step which uses a special purpose halftone screen configured to: decode the encoded version of the electronic integral image that was transmitted into the engine, and render an accurate representation of the original integral image information in the print engine with high fidelity. In some instances, the order of steps may be different, and/or additional steps may be provided. For example, the tone adjustment step may be combined into the halftoning step, or performed before the encoding step.

The printing system may include a printing device which is configured to generate tangible image output using varying tones or levels of ink intensity, such as, for example, xerographic, ink jet, bubble jet, dye-sublimation, etc. One example of a printing system that may be used is the Xerox Corp. iGen3® and iGen4® digital production presses. Typically, these systems employ an architecture that incorporates each of the aforementioned components, including a compression and decompression stage, followed by a TRC and threshold based rendering module.

FIG. 3 shows an exemplary method 300 for encoding and screening electronic integral images in a printing system in accordance with an embodiment.

In step 310, the electronic integral image may be subject to an encoding scheme that adds temporary image data to one or more portions of the background area image data to produce a "smooth" encoded image that contains the original integral image data. This smoothing helps to reduce the spatial variance across the encoded electronic integral image. More particularly, the smooth encoded image will significantly reduce undesired signal or data loss that would otherwise result from use of a conventional lossy block-based compression method This encoding and smoothing operation does not change any of the original integral image data, and its presence in the encoded image will protect the integral image data from suffering significant changes resulting from compression related loss. The temporary image data added to the backgrounds areas in the encoded process will be removed at a later time, or omitted from the final rendered output.

Next, in step 320, the tone reproduction curve (TRC) range of the printing system may be adjusted so as to reserve at least one predetermined threshold value for decoding purposes. As such, at most, one gray-level value of the sub-image data may be lost in this process, such as, for example, the reserve pixel value. However, the loss of one value or level of tone information in the sub-image data is unlikely to even be recognized by an observer, especially after halftoning. For example, for 8-bit gray level image data having $2^8$ or 256 different gray level values (i.e., 0-255), the highest pixel value of 255 may be used for the reserve value. In rendering, video values equal or above the halftone threshold value produce marked output. If all video is guaranteed to be below a maximum reserved value, then this reserved value can be used to guarantee that all of the temporary data can be discarded. All of the background pixels that will be assigned temporary data (below the reserved threshold) may be assigned halftone threshold values above the reserved threshold during the rendering step. This will ensure that all temporary data will be discarded by the halftone rendering threshold operation. The screen can be designed to assign these reserved threshold values appropriately. The screen design is intended to account for the layout of the original integral image. It will be appreciated that the reserve value could be any value that exceeds the maximum value of the temporary data.

Sub-image data may be adjusted so as to exclude pixel values in the electronic integral image corresponding to the background area image data. For instance, the sub-image data values 0 to 255 (for 8-bit data) may be mapped into the range 0 to 254—with pixel values of both 254 and 255 may mapped to the value 254, and all other values otherwise being the same. Other mappings schemes could also be used. The sub-images can still be reproduced because the halftoner may be configured to recognize the compressed TRC values of 0-254 as actual color tones of the print system, and the value 255 as a reserve value for decoding the encoded electronic integral image.

And, in step 330, a special halftone screen may be used by the halftoner which is configured to decode the encoded electronic integral image and render the integral image data. In this instance, a portion of the values (i.e., those set to the reserve value) perform the decoding, while the remaining portion may be used in performing a conventional halftoning operation for rendering the desired image stream or image video. These operations may be performed substantially simultaneously by the halftoner.

Figure 4:
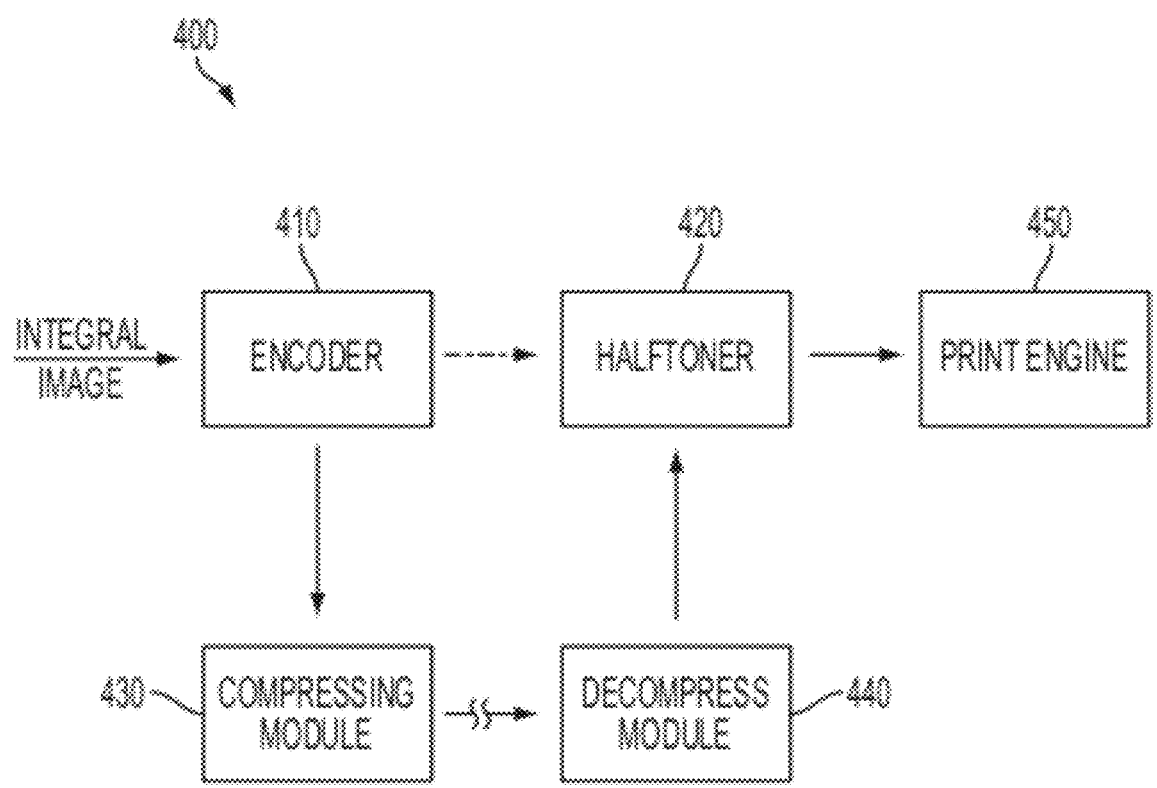
FIG. 4 shows a printing system for encoding and screening integral images in accordance with an embodiment.

FIG. 4 shows a printing system 400 for encoding and screening integral images in accordance with an embodiment.

First, an electronic integral image is input to an encoder 410. The encoder 410 may be configured to encode or add temporary image data into one or more portions of the background image data of the electronic integral image. For instance, the electronic integral image may be encoded by replacing white or background image data that separate sub-images with temporary image data having a tone level similar to one or more of its surrounding sub-images. One possibility is to replace at least a portion of the background or the white image data separating the sub-images with the average pixel value of its nearest neighboring sub-images. As discussed above, the temporary image data reduces spatial variance across the electronic image which helps to improve or optimize data compression without significant signal or data loss.

The electronic integral image may be loaded from a memory, or another data source, such as a scanner. In some instances, the input data to the printing system contains modest resolution continuous valued data. Binary value markings, for instance, may be applied by a raster optical scanner (ROS) system. In one implementation, a rendering module (not shown) may be configured to substitute each continuous valued area with a plurality of binary value levels of area coverage. In the printing system, sub-images composed of gray value pixels may be replaced with a plurality of addressable binary pixels. In one implementation, eight addressable binary pixels may be used instead of gray values pixels. This can enable each sub-image of an electronic integral image to be individually imaged with a variety of levels of area coverage. For example, with 4 separations (e.g., CMYK), and nine levels of area coverage (0 to 8), $9^4$ or 6,561 distinct levels of cyan, magenta, yellow, and black may be applied.

In practice, neighboring sub-images associated with the same scene are closely correlated in tone, so dithering techniques can be employed to make the halftone screen produce a larger number of distinct colors as perceived by a human observer (whose perception at each point is due to the visual response of multiple sub-images).

From the encoder 410, the encoded electronic integral image may be transmitted to the halftoner 420.

The halftoner 420 may be software (or firmware), hardware, or a combination thereof, as known in the art. In some instances, the halftoner 420 may be obtained and modified, for example, from an original equipment manufacturer (OEM) or vendor. As known in the art, a halftoner is a processor configured to perform raster image processing (RIP) so as to generate a raster image for rendering by a print engine 450. The halftoned image outputted from the halftoner 420 may then be transmitted to the print engine 450 for printing.

The print engine 450 may include, for instance, one or more print engines configured to render a tangible image on a print media, such as paper.

In addition, the halftoner may function as a decoder to remove the temporary image data added to the background area image data by the encoder. Thus, the pixels that started out as (white) background areas, can revert to background areas when rendered.

Alternatively, in some implementations, the encoded image outputted from encoder 410 may be compressed by a data compression module 430. A lossless data compression algorithm may be executed by a processor. For example, a block-based compression scheme may be advantageously used to reduce memory requirements. However, it is understood that other data compression algorithms may also be used, preferably, those which provide lossless compression. If tolerable, though, lossy compression algorithms might also be used.

Compressing the electronic integral image data is also advantageous for transmitting data over a communication channel, such as a network. The compressed image data helps to reduce bandwidth requirements on the network. The network may include, but is not necessarily limited to, the Internet, Intranets, WANs, LANs, Wireless networks, or combinations thereof. Data compression may also be advantageously used for facsimile transfer.

Alternatively or additionally, the compressed image may be subsequently stored in a memory (not shown), for example, an electronic pre-collation system (EPC) module with associated memory. The encoded image might also be stored in memory without compression, if memory and/or bandwidth requirements are not a consideration.

When the images are later needed by the print engine 450, they may be retrieved from memory (and/or receiving via network transmission) and subsequently decompressed. A decompression module 440 may be used to restore the compressed data, using an algorithm executed by a processor for reversing the compression scheme used in the compression module 430. The decompressed image data may be substantially identical to the encoded image data that was outputted from the encoder 410. Next, the decompressed image is transmitted to halftoner 420 and processed similarly as discussed above. The compression module 430, decompression module 440, or both, may be implemented as software (firmware), hardware, or combinations thereof.

Figure 5:
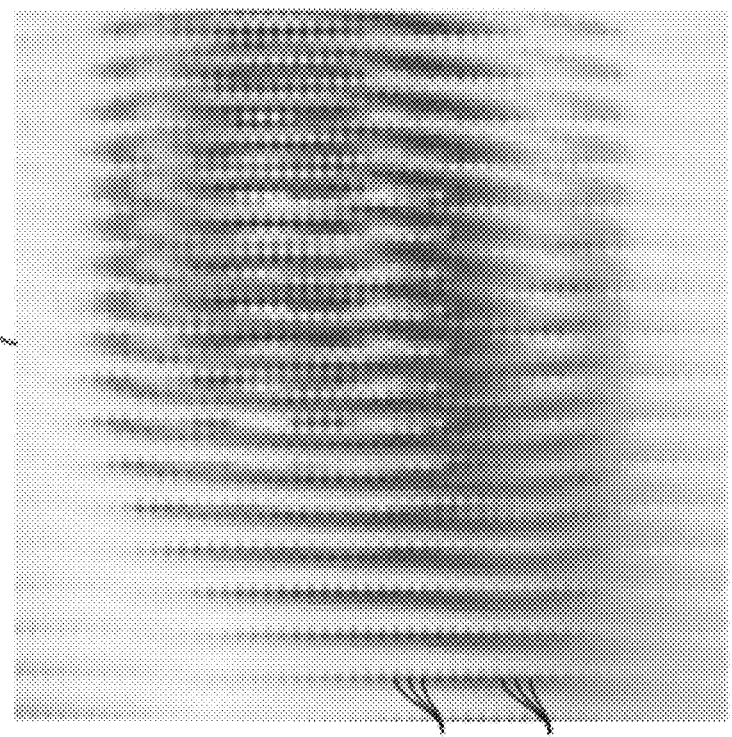
FIG. 5 shows one exemplary encoding scheme in accordance with an embodiment.
Figure 5:
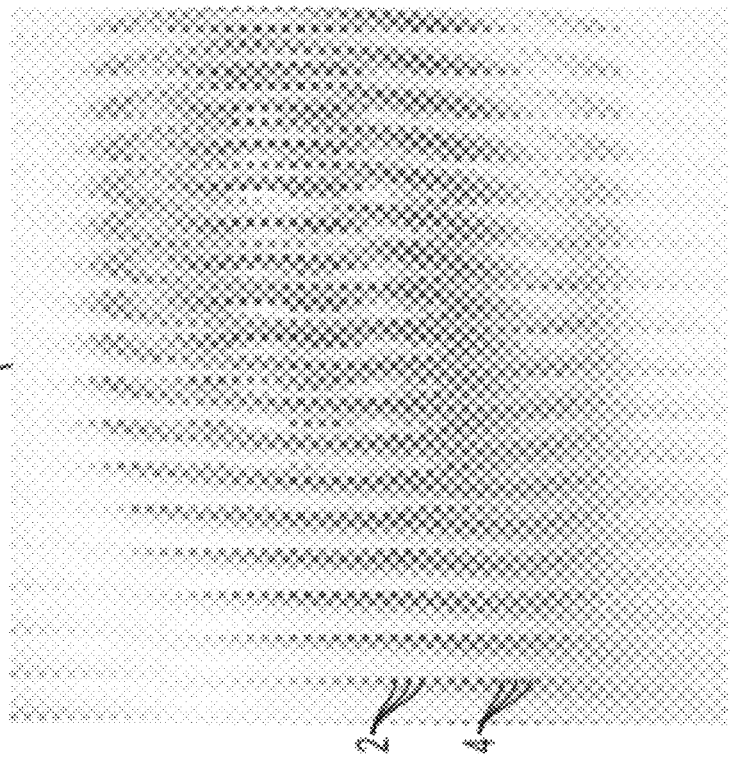

FIG. 5 shows one exemplary encoding scheme 500 in accordance with an embodiment.

The original integral image is shown as 510 having a plurality of small sub-images 512 and background areas 514 separating the sub-images 512. The sub-images 512 and background areas 514, as shown, are arranged in a checkerboard configuration or pattern (although other patterns are also possible). In the encoded integral image 520, sub-images 522 may be the substantially the same as corresponding sub-images 512 in the original integral image 510. At most, one tone level for pixel values (e.g., 255 for 8-bit image data) of the sub-image data may be lost.

One the other hand, temporary image data is added to one or more portions of the white background areas 514 separating the sub-images 512 to form background image data 524 in the encoded integral image 520. The temporary image data added to the one or more portions of the white background areas 514 may be based upon one or more neighboring sub-images 512 so as to reduce the spatial frequency of the entire encoded integral image 520. Portions of the encoded background image data 524 may have the same or similar pixel values as the surrounding sub-image image data 512. The encoded integral image 520 can be a separate data file, or a modified version of the original integral image 510.

Figure 2:
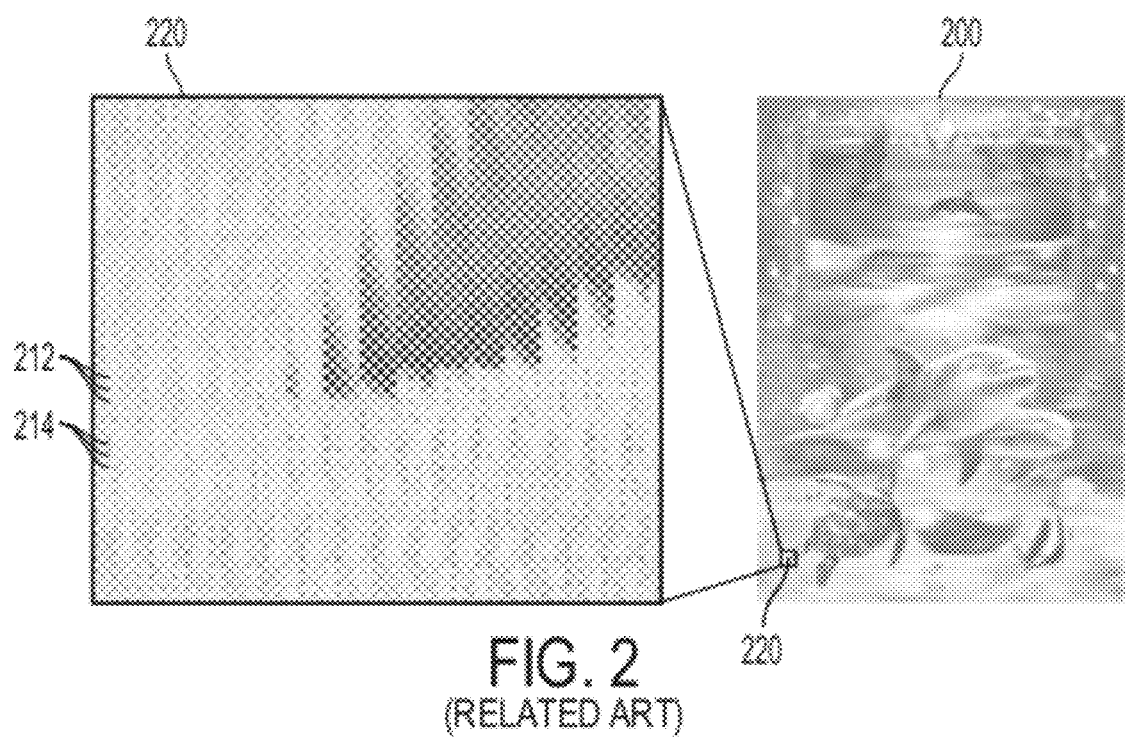
FIG. 2 shows a magnified portion of another exemplary integral image having a number of small sub-images.
Figure 6:
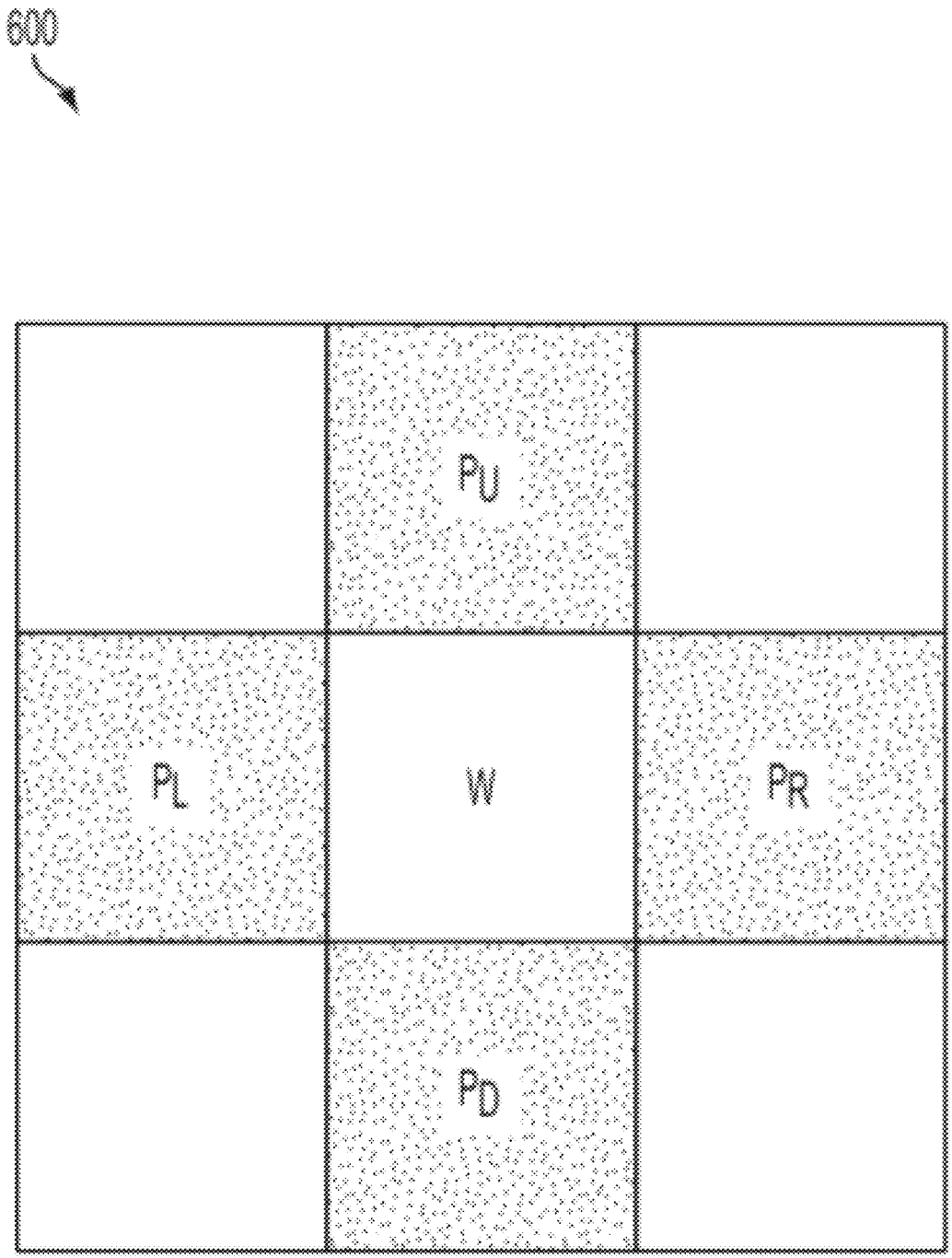
FIG. 6 shows one exemplary halftone screen which may be used to decode the encoded integral image and to render the integral image in accordance with an embodiment.

FIG. 6 show an exemplary checkerboard pattern 600 having a central white background area W surrounded by and separating four neighboring sub-images $P_U$, $P_D$ $P_L$, and $P_R$. The pattern 600 may repeat throughout the electronic integral document (for instance, as shown in FIG. 2), but need not.

The central white background area W may be encoded with the values of one of: $P_U$, $P_D$, $P_L$, $P_R$, or average values of combinations thereof. In some instances, the white background image data W may be replaced, for instance, with the average pixel values of the sub-images above and below, or to the left and right. The option of using only $P_L$ or $P_R$ to replace background area W may be more advantageous for systems that employ run-length encoding based compression techniques which are commonly used in encoded data formats such as Truevision, TGA, Packbits, PCX, and the Interleaved Bitmap ILBM Interchange File format. An algorithm may be used, for instance, to determine a pixel value (or color) which is solely, or predominantly used (e.g., greater than 50%), in the sub-images $P_U$, $P_D$, $P_L$, and/or $P_R$. For improved smoothness, W should be the average value of $P_U$, $P_D$, $P_L$, and $P_R$ in applications that employ block based techniques such as JPEG.

In each case, the encoded image may be made more "smooth" (i.e., less spatial variance across the encoded image) and thus, more easily compressed and subsequently decompressed without suffering from significant signal or data loss.

FIG. 6 shows one exemplary halftone screen 600 which may be used to decode the encoded electronic integral image and render the integral image in accordance with an embodiment.

In some implementations, the halftone screen 600 may be automatically generated based on the input electronic integral images, which threshold portions corresponding to the background image data and sub-image data, respectively.

The halftone screen 600 shown is configured in a checkerboard pattern for encoding a similarly configured electronic integral image (such as shown in FIG. 2). Other halftone screens are also possible that generally conform to the electronic integral image.

Some pixel threshold patterns (shown marked in the figure as 255*s*) may be set to the highest value, such as 255 (for 8-bit image data) in order to remove the temporary image data that was added to the white background areas and return them to their original values.

The other threshold values of the screen 600 (shown having vertical hashing) may be assigned any valid threshold value required to image the valid sub-image data. For example, if the sub-image region corresponds to the size of a halftone cell having 4 pixels, the 4 thresholds may be 32, 96, 160, and 224 (⅛th, ⅜ths, ⅝ths, and ⅞ths of the range). More generally, if there are N pixels supporting a digital range of M graylevels, then the thresholds can take on values of $M(k-0.5)/N$, for $k=1, 2, \ldots N$. To achieve more graylevels of support, conventional dithering techniques can be employed. If the intended perception is a function of a plurality of neighboring sub-images, then dithering can scale the number of supported graylevels by the same plurality scale factor. Grouping consecutive sub-image pixel values together (e.g., 4 or more), and dithering the threshold values may be an effective way of accurately imaging the intended sub-image appearance, and achieving an acceptable number of level of tone.

FIG. 7 shows another method 700 for encoding and screening integral images in a printing system in accordance with an embodiment. Method 700 is similar in some regards to method 300 (FIG. 3) but also includes compression and decompression processes.

Integral image 710 is shown as a checker-board integral image. Through encoding scheme 500 (FIG. 5), encoded image 720 with temporary data is generated.

The encoded image may be subject to compression 730 and decompression 740 processes, for instance, using conventional schemes. For example, a Lempel-Ziv (LZ) compression or a Huffman coding technique may be employed in some implementations to reduce memory requirements. Of course, it is understood that other data compression algorithms may also be used, preferably those which provide lossless compression. Although, lossy algorithms may also be used.

One or more image processors may implement compression 730 and decompression 740. After decompression, decompressed image 745 is substantially the same, or closely resembles integral image 710.

TRC 750 reserves a value which will be used to identity and later remove the temporary data that was added to the original integral image 710. For example, for 8-bit gray level image data having $2^8$ or 256 different gray level values (i.e., 0-255), the highest pixel value of 255 may be used for the reserve value. In rendering, video values equal or above the halftone threshold value produce marked output. If all video is guaranteed to be below a maximum reserved value, then this reserved value can be used to guarantee that all of the temporary data can be discarded. All of the background pixels that will be assigned temporary data (below the reserved threshold) will be assigned halftone threshold values above the reserved threshold during the rendering step.

Rendering 760 decodes encoded image 720 and eliminates the added temporary data so as to reconstruct the integral image. A special halftone screen may be used by the halftoner which is configured to decode the encoded electronic integral image and render the integral image data. In this instance, a portion of the values (i.e., those set to the reserve value) perform the decoding, while the remaining portion may be used in performing a conventional halftoning operation for rendering the desired image stream or image video. These operations may be performed substantially simultaneously by the halftoner.

One exemplary threshold array 770 for a haltoner that discards temporary data is shown in FIG. 7, although it will be appreciated that other haltoning patterns may be used. When encoded image 720 is rendered with threshold array 770, an integral image 780 is generated which corresponds to the original integral image 710.

While the process 700 is depicted in gray scale (i.e., monochrome), it will be appreciated that it may be used for color image data also. In addition, while cluster screening has been shown, it will be appreciated that dispersive rendition may work as well, for instance, as long as the white checker-board portion of the integral image 710 is left all white.

One or more processors have been described herein. It will be appreciated that the processors may include hardware, such as Application Specific Integrated Circuits (ASICs), Field Programmable Gate Arrays (FPGAs), digital signal processors (DSPs), or other integrated formats. However, those skilled in the art will recognize that the processors may, in whole or in part, be equivalently implemented in integrated circuits, as one or more computer programs having computer- or machine-executable instructions or code running on one or more computers (e.g., as one or more programs running on one or more computer systems), as one or more programs running on one or more processors (e.g., as one or more programs running on one or more microprocessors), as firmware, or as any combination thereof, and that designing the circuitry and/or writing the code for the software and/or firmware would be well within the skill of one skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of computer- or machine-readable medium used to carry out the distribution.

While this disclosure has been described in connection with what is presently considered to be the most practical and preferred embodiments, it is to be understood that it is capable of further modifications and is not to be limited to the disclosed embodiments, and this disclosure is intended to cover any variations, uses, equivalent arrangements or adaptations of the inventive concepts following, in general, the principles of the disclosed embodiments and including such departures from the present disclosure as come within known or customary practice in the art to which the embodiments pertains, and as may be applied to the essential features hereinbefore set forth and followed in the spirit and scope of the appended claims.

What is claimed is:

1. A method for encoding and screening electronic integral images comprising:
   receiving an electronic integral image having a plurality of sub-images comprised of image data, wherein at least one sub-image is spaced apart from another sub-image by a background area;
   adding temporary image data to at least a portion of the background area image data based on image data of one or more surrounding sub-images so as to reduce the spatial variance across at least a portion of the electronic integral image and to make it more compatible to data compression without significant signal or data loss; and
   subsequently removing the temporary image data added to the electronic integral image so as to reconstruct an accurate representation of the electronic integral image.

2. The method according to claim 1, further comprising:
   adjusting a tone range of the printing system so as to reserve a predetermined value used to facilitate removing the temporary image data added to the background area.

3. The method according to claim 2, wherein the predetermined value is 255 for 8-bit image data.

4. The method according to claim 1, further comprising:
   electronically compressing the electronic integral image having the added temporary image data.

5. The method according to claim 4, further comprising:
   electronically decompressing the compressed electronic integral image having the added temporary image data.

6. The method according to claim 1, wherein each sub-image comprises one or more pixels.

7. The method according to claim 1, wherein adding temporary image data to at least a portion of the background area image data based on image data of one or more surrounding sub-images comprises one of:
   (i) selecting the value of one the surrounding sub-image nearest to the portion of the background area;
   (ii) averaging values of all the surrounding sub-images nearest to the portion of the background area;
   (iii) averaging values of the sub-images above and below the portion of the background area; or
   (iv) averaging values of the sub-images to the left and to the right of the portion of the background area.

8. The method according to claim 1, further comprising:
   adjusting sub-image data so as to exclude pixel values corresponding to the original background area.

9. The method according to claim 1, wherein removing the added temporary image data includes using a halftone screen to decode the added temporary image data.

10. The method according to claim 8, wherein one or more portions of the halftone screen are configured to change the added temporary image data to the original background image data.

11. The method according to claim 1, wherein sub-image image data is composed of gray value pixels and are replaced with addressable binary pixels.

12. The method according to claim 1, further comprising:
    grouping consecutive sub-image data values together; and
    dithering grouped sub-image data.

13. A system for encoding and screening electronic integral images in a printing system comprising:
    an encoder processor configured to:
       (i) receive an electronic integral image having a plurality of sub-images comprised of image data, wherein at least one sub-image is spaced apart from another sub-image by a background area; and
       (ii) add temporary image data to at least a portion of the background area image data based on image data of one or more surrounding sub-images so as to reduce the spatial variance across at least a portion of the electronic integral image and to make it more compatible to data compression without significant signal or data loss; and
    a halftoner configured to remove the temporary image data added to the electronic integral image.

14. The system according to claim 13, further comprising:
    a tone reproduction curve (TRC), stored in memory, of the printing system having a predetermined value reserved for removing the added temporary image data.

15. The system according to claim 14, wherein the predetermined value is 255 for 8-bit image data.

16. The system according to claim 13, further comprising:
    a processor configured to compress the electronic integral image having the added temporary image data.

17. The system according to claim 16, further comprising:
    a processor configured to decompress the compressed electronic integral image having the added temporary image data.

18. The system according to claim 13, wherein each sub-image comprises one or more pixels.

19. The system according to claim 13, wherein, in adding temporary image data to at least a portion of the background area image data based on image data of one or more surrounding sub-images, the encoder is configured to perform one of:
    (i) select the value of one the surrounding sub-image nearest to the portion of the background area;
    (ii) average values of all the surrounding sub-images nearest to the portion of the background area;
    (iii) average values of the sub-images above and below the portion of the background area; or
    (iv) average values of the sub-images to the left and to the right of the portion of the background area.

20. The system according to claim 13, wherein the encoder is configured to adjust sub-image data so as to exclude pixel values in the electronic integral image corresponding to the background area.

21. The system according to claim 13, wherein the halftoner uses a halftone screen to remove the added temporary image data.

22. The system according to claim 21, wherein one or more portions of the halftone screen are configured to change the added temporary image data to the original background image data.

23. The system according to claim 13, wherein sub-image image data is composed of gray value pixels and the printing system replaces the gray level values with addressable binary pixels.

24. The system according to claim 13, wherein the halftoner is configured to:

group consecutive sub-image data values together; and dither grouped sub-image data.

\* \* \* \* \*